United States Patent [19]

Dunn

[11] 4,033,569
[45] July 5, 1977

[54] DEFORMATION-PREVENTING WORKPIECE-HOLDING FIXTURE FOR MACHINE TOOLS

[76] Inventor: Garf L. Dunn, 31720 Hunters Drive, Farmington Hills, Mich. 48018

[22] Filed: Oct. 15, 1976

[21] Appl. No.: 732,797

[52] U.S. Cl. .............................. 269/26; 51/217 R; 269/106; 269/266

[51] Int. Cl.² ................... B24B 41/06; B25B 1/20; B25B 1/24

[58] Field of Search .......... 269/104, 105, 106, 266, 269/321 W, 26; 51/217 R

[56] References Cited

UNITED STATES PATENTS

| | | | |
|---|---|---|---|
| 2,338,603 | 1/1944 | Schultz | 269/26 |
| 2,565,925 | 8/1951 | Lombard et al. | 51/217 R |
| 3,818,646 | 6/1974 | Peterson | 51/217 R |

Primary Examiner—Al Lawrence Smith
Assistant Examiner—Robert C. Watson
Attorney, Agent, or Firm—Willis Bugbee

[57] ABSTRACT

For holding while machining the end enlargement or enlargements of an elongated otherwise thin deformable workpiece, such as a jet engine blade, the lower block of a two-part hinged fixture has mechanically-adjustable stops which predetermine the location of the front edge and front end of the thin portion of the workpiece and has three upwardly-inclined support pins upon which the lower surface of the thin portion rests. An upper block hinged to the lower block contains three downwardly-inclined correspondingly located clamping pins which bear upon the upper surface of the thin portion immediately above the lower support pins. Each block contains horizontally-movable forward and rearward hold-fast pins for the workpiece end enlargements. A multiplicity of pairs of aligned hydraulically-actuated upper and lower deformation-preventing plungers in both the lower and upper blocks are then set in motion to press simultaneously against the upper and lower surfaces of the thin portion of the workpiece while forward and rearward lower and upper plungers are urged outward against its opposite ends by spring pressure and locked hydraulic pressure fluid created by rotating a screw-threaded piston against hydraulic fluid already present in the upper and lower blocks of the fixture and communicating with the hydraulically-actuated deformation-preventing plungers through upper and lower networks of passageways. The clamping plungers are hydraulically-actuated (FIGS. 1 to 5), or spring-actuated (FIGS. 6 and 7), or screw actuated (FIG. 8).

15 Claims, 10 Drawing Figures

DEFORMATION-PREVENTING WORKPIECE-HOLDING FIXTURE FOR MACHINE TOOLS

BACKGROUND OF THE INVENTION

Hitherto, it has been found difficult to machine enlargements of metallic workpieces having thin portions interconnecting such enlargements or projecting from a single enlargement without causing undesirable deformation of the thin portion. Prior attempts to prevent such deformation have included casting a molten matrix material around the thin portion between the thick portions, after which the machining of the thick end portions was carried out, whereupon the matrix material is melted away from the thin portion of the workpiece. This procedure, however, has added considerably to the expense of producing such workpieces and has resulted in heavy expenditure of time and frequent distortion of the workpiece notwithstanding this attempted prevention. This problem has been particularly acute in the machining of the enlarged opposite end portions or of the single end enlargement of a jet engine blade, the airfoil section between the thicker opposite ends or projecting from the single enlarged end being considerably thinner and therefore subject to undesired deformation during machining of the opposite end enlargements or of the single end enlargement, as the type of blade may be.

SUMMARY OF THE INVENTION

The invention principally resides in the hingedly-connected lower block or base and the upper block or cover containing between them a cavity for receiving the workpiece with the opposite end enlargement or single end enlargement to be machined projecting outward therefrom. The invention also resides in workpiece-locating stops, end hold-fast pins, adjustable support pins in the lower block and clamping pins in the upper block, and also in multiple aligned pairs of lower and upper hydraulically-actuated deformation-preventing plungers brought into operation after the thinner portion of the workpiece has been clamped in position between the support pins and the clamping pins to support the thinner airfoil blade portion while the fixture is being held and the end enlargements are being machined in a machine tool, such as a turret lathe. The invention also resides in the self-contained hydraulic pressure fluid generator which supplies hydraulic pressure fluid to the network of passageways leading therefrom to the aligned pairs of hydraulic deformation-preventing plungers in the lower and upper fixture blocks. The invention finally resides in hydraulically-actuated locks which engage certain of the pins and prevent them from shifting from their adjusted positions.

Figure 1:
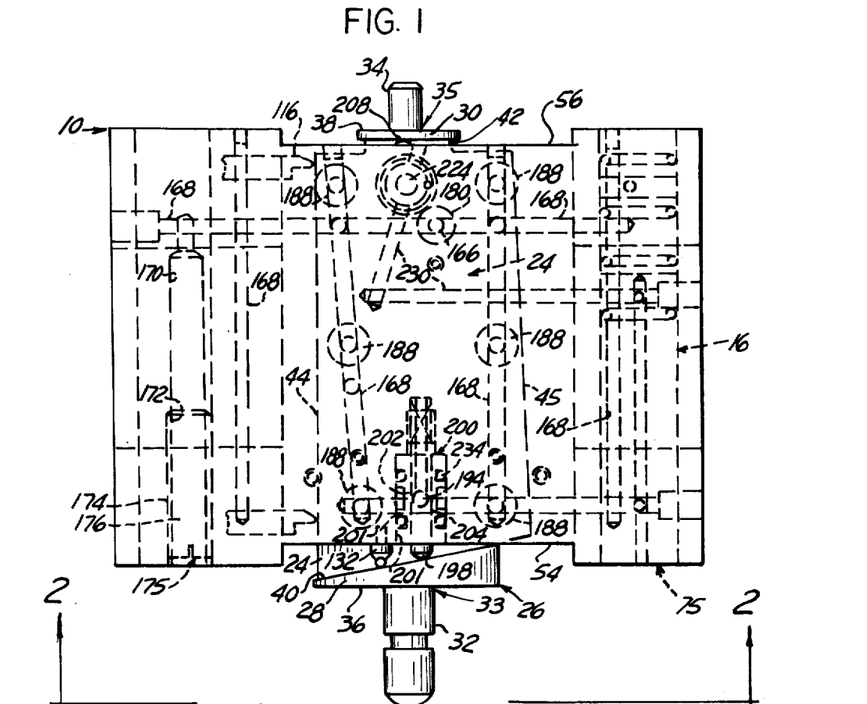
FIG. 1 is a top plan view of a deformation-preventing workpiece-holding fixture, according to one form of the invention.
Figure 2:
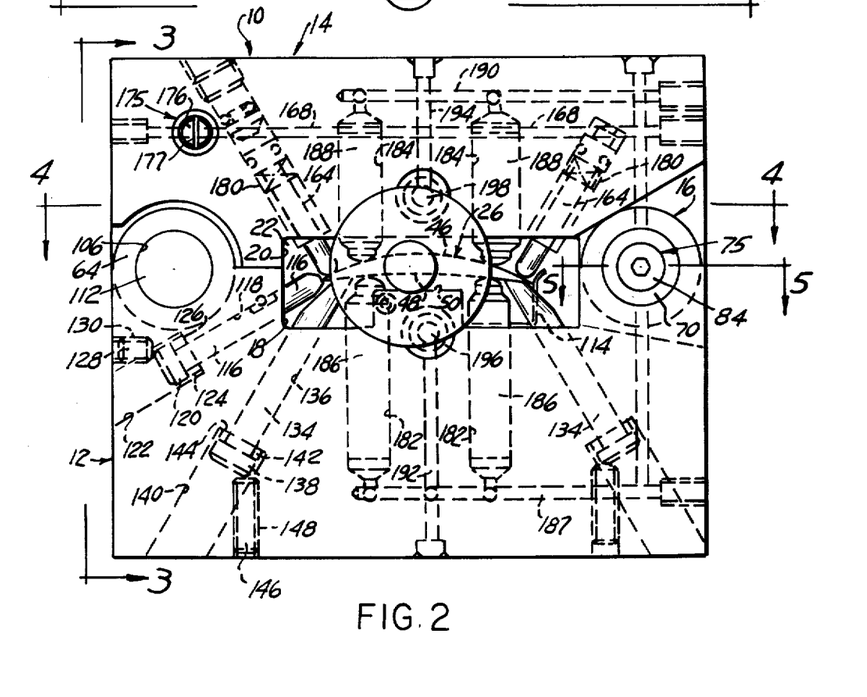
FIG. 2 is a front end elevation of the fixture shown in FIG. 1 looking in the direction of the arrows 2—2 therein.
Figure 3:
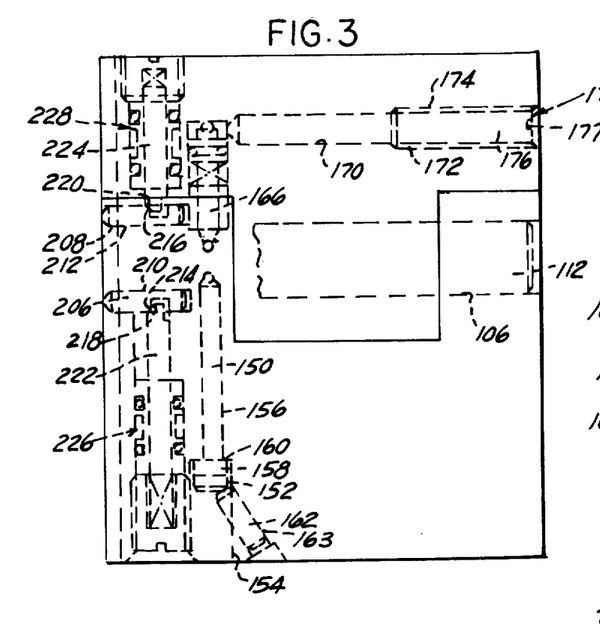
FIG. 3 is a left-hand side elevation of the fixture looking in the direction of the arrows 3—3 in FIG. 2.

Referring to the drawings in detail, FIGS. 1, 2, and 3 show a deformation-preventing workpiece-holding fixture, generally designated 10, according to one form of the invention as consisting generally of a lower fixture block or base 12 and an upper fixture block or cover 14 hingedly connected to one another along a hinge structure, generally designated 16. The lower and upper blocks 12 and 14 are provided with cooperating lower and upper workpiece cavity portions 18 and 20 facing one another and collectively forming a workpiece cavity 22. The cavity 22 is configured to receive and fixedly hold the intermediate or airfoil portion 24 (FIG. 1) of an elongated workpiece, generally designated 26, specifically a jet engine blade having, at the opposite ends of the intermediate or airfoil portion 24, forward and rearward enlargements or heads 33 and 35 including flanges 28 and 30 respectively from which project, in opposite directions, forward and rearward integral stub shafts 32 and 34 respectively. The fixture 10 is so constructed and arranged as to hold the relatively thin and curved airfoil portion 24 without deformation while the flanges 28 and 30 and their respective integral shafts 32 and 34 of the forward and rearward end portions 33 and 35 respectively are being turned in a turret lathe or other suitable machine tool. The flanges 28 and 30 have radial outer surfaces 36 and 38, whereas the forward flange 28 has an inclined inner surface 40 while the rearward flange 30 has a radial inner surface 42. These flange surfaces 40 and 42 are important in properly locating the airfoil portion 24 of the workpiece 26 within the fixture 10 as are also the leading edge 44 and possibly also the trailing edge 45 of the airfoil portion 24, as well as the convex and concave upper and lower surfaces 46 and 48 thereof. Two upstanding rectangular forward and rearward bosses 50 and 52 (FIG. 4) also are present at the opposite ends of the lower cavity portion 18.

The lower and upper blocks 12 and 14 cooperate with one another to provide forward and rearward recesses 54 and 56 respectively (FIGS. 1 and 4) adapted to receive and provide clearance for the forward and rearward flanges 28 and 30 and their respective integral forward and rearward shafts 32 and 34 of their forward and rearward end enlargement portions 33 and 35 while these are being machined and while the fixture is being held fast in the particular machine tool, such as the above-mentioned turret lathe. The lower block 12 is provided on its hinged or right-hand side (FIGS. 1, 2, and 4) with forward and rearward hollow hinge bosses 58 and 60 containing coaxial bores 72 and 76 and spaced apart from one another sufficiently to receive between them a cooperating hollow cylindrical hinge boss 62 containing a bore or recess 74 coaxial with the bores 72 and 76 (FIG. 5) and projecting downward from the right-hand or hinged side of the upper block 14. Corresponding thereto are forward and rearward hollow lock bosses 64 and 66 respectively also spaced apart from one another to receive a hollow lock boss 68 extending downward from the upper fixture block 14. The hinged side of the fixture 10 is pivotally mounted between the bosses 58, 60, and 62 by a composite hinge shaft 70 (FIG. 5) mounted in the coaxial communicating hinge bores 72, 74, and 76 in the bosses 58, 62, and 60. The composite hinge shaft 70 in turn serves as a container for a first hydraulic pressure fluid generator, generally designated 75, for supplying hydraulic pressure fluid, such as hydraulic oil, to a hydraulic system described in more detail below. For this purpose, the pivot shaft 70 is provided with a central bore 78 and threaded counterbore 80 for receiving the pressure-generating hydraulic screw plunger 82 reciprocable in the bore 78 and having a threaded head 84 threadedly engaging the threaded bore 80. The head 84 is provided with a hexagonal so-called Allen wrench socket 86 by which the plunger 82 may be rotated. The plunger 82 engages the outer end of a cylindrical force-transmitting plug 88 engaging a cup-shaped resilient sealing member 89, which in turn is reciprocable in a cylinder bore 90 containing hydraulic fluid. The rearward end of the pivot shaft 70 is provided with multiple annular sealing grooves 92 within the bore 74 in the boss 62 and with multiple sealing grooves 94 within the bore 76 of the boss 60, these sealing grooves 92 and 94 being adapted to receive conventional O-rings (not shown) which effectively seal the fluid-transmitting intermediate grooves 96 and 98 respectively from leakage of hydraulic pressure fluid reaching them from the inner end of the bore 78 beyond the sealing gasket 90 and flowing through the central axial passageway 100 and thence upward and downward through the radial forward and rearward passageways 102 and 104 respectively.

Figure 4:
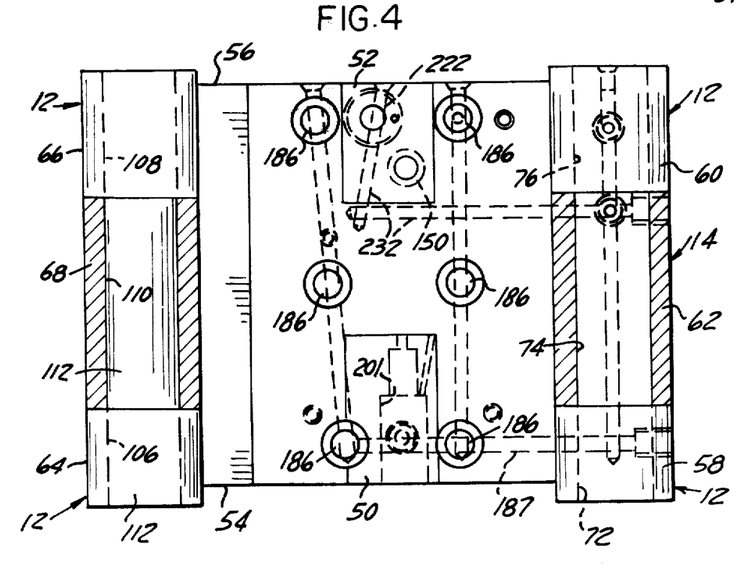
FIG. 4 is a horizontal section through the fixture of FIG. 1, taken along the line 4—4 in FIG. 2 omitting the upper fixture block, the composite hinge shaft, and the fixture-locking shaft.

The lower bosses 64 and 66 and the upper boss 68 located on the opposite side of the fixture 10 from the bosses 58, 60, and 62 are provided with coaxial communicating bores 106, 108, and 110 respectively which are adapted to receive a fixture-locking shaft 112 (FIGS. 2 and 4). The shaft 112 is removed when it is desired to raise the upper fixture block or cover 14 relatively to the lower fixture block or base 12 around the composite hinge shaft 70 as a pivot. When the upper block or cover 14 is thus swung upward, into a vertical position, the upper cavity half 20 is swung away from the lower cavity half 18 to fully expose the complete cavity 22 for the insertion of the workpiece 26.

Mounted in the lower cavity half 18 of the lower block or base 12 is an L-shaped leaf spring 114 (FIG. 2), the upstanding arm of which bears against the trailing edge 45 of the airfoil portion 24 of the workpiece 26 and urges the latter against two forward and rearward leading edge stops (FIG. 1) which consist of two upwardly-inclined non-rotatable carbide-tipped stop pins 116 mounted in upwardly-inclined smooth bores 118 (FIG. 2), the enlarged heads 120 of which within the counterbores 122 are locked in position by adjustment shim washers 124 against the annular shoulders 126 by headless set screws 128 within the horizontal threaded screw holes 130. The workpiece 26 also is located longitudinally by a horizontal carbide-tipped forward stop pin 132 (FIG. 1) having its shank fixedly mounted in the forward wall of the forward recess 54 and adapted to bear against the inclined inner surface 40 of the forward flange 28 of the workpiece 26.

The lower or concave surface 48 of the workpiece 26 at its forward end is fixedly but adjustably positioned by two upwardly-inclined forward contoured support pins 134 (FIG. 2) similar to the leading edge stop pins 116 and similarly mounted in smooth bores 136 with their heads 138 within the counterbores 140 bearing against adjustment shim washers 142 which in turn bear against the annular shoulders 144 between the bores 136 and counterbores 140. As before, these support pins 134 are locked in position by headless set screws 146 threaded into threaded screw holes 148. The concave surface 48 at its rearward end is similarly supported in an adjustably fixed position by a vertical contoured rearward support pin 150 (FIGS. 2, 3, and 4) of similar construction to the leading edge stop pins 116 and support pins 134 and similarly locked in position (FIG. 3) by having its head 152 held within the counterbore 154 of its bore 156 against an adjustment shim washer 158 which in turn is held against the annular shoulder 160 by a headless set screw 162 threaded through the upwardly-inclined screw hole 163 against the head 152.

Cooperating with the three support pins 134 and 150 and bearing against the upper convex surface 46 of the workpiece 26 are two downwardly-inclined hydraulically-actuated clamping pins 164 (FIG. 2) and a vertical hydraulically-actuated rearward clamping pin 166 (FIG. 3), with their brass tips aligned through the workpiece 26 with and directly above the contoured tips of the three support pins 134 and 150. Above the hydraulic clamping pins 164 and 166, a passageway network 168 leads to a cylindrical chamber 170 (FIGS. 1 and 2) into the therewith-communicating threaded forward bore 172 within the sleeve or cylinder 174 of which is threaded a screw piston 176 of a second hydraulic pressure fluid generator, generally designated 175. The chamber 170 and passageway 168 contain a hydraulic fluid such as oil which, when acted upon by the inward rotation of the screw piston 176 by a hexagonal so-called Allen wrench (not shown) engaging the hexagonal so-called Allen wrench socket 177 therein, forces that hydraulic fluid into the spaces in the bores 180 above the clamping plungers 164 and 166, causing them to move downward into clamping engagement with the convex upper surface 46 of the workpiece 26 against the upper ends of the three support pins 134 and 150, as explained more fully below in connection with the operation of the invention.

Figure 5:
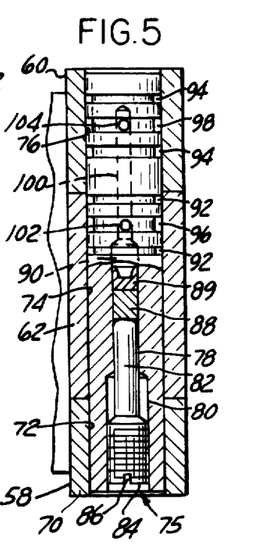
FIG. 5 is a horizontal section through the composite hinge structure containing the hydraulic pressure-generating device, in horizontal section, taken along the line 5—5 in FIG. 2.

In order to prevent distortion of the airfoil portion 24 during the machining of the opposite end portions 33 and 35 of the workpiece 26, the base block 12 and cover block 14 are provided with spaced parallel multiple lower and upper cylinder bores 182 and 184 respectively (FIGS. 2 and 4) which contain hydraulic deformation-preventing pressure-equalizing plungers 186 and 188 supplied with hydraulic pressure fluid through a network of lower and upper passageways 187 and 190 leading to the vertical passageways 102 and 104 (FIG. 5). These are filled with hydraulic fluid, such as oil, which is placed under pressure when the screw plunger 82 of the first hydraulic pressure fluid generator 75 is moved inward in its bore 78 by rotating its head 84 by a hexagonal so-called Allen wrench engaging the hexagonal so-called Allen wrench socket 86. Lower and upper branch passageways 192 and 194 respectively communicating with the lower and upper passageway networks 187 and 190 serve to clamp spring-pressed forward lower and upper forward end hold-fast pins 196 and 198 respectively (FIGS. 1, 2, and 4) acting against the inclined surface of the front or forward flange 28 of the workpiece 26. This clamping is accomplished (FIG. 1) by spool-shaped clamping devices, generally designated 200 mounted in bores 201 surrounding the hold-fast pins 196 and 198, each of the devices 200 containing an annular hydraulic chamber 202 with thin resilient walls 204 which are forced radially inward into clamping engagement with the respective hold-fast pins 196 or 198 in response to hydraulic pressure fluid reaching them from the passageways 192 and 194 which in turn receive hydraulic pressure fluid from the first hydraulic pressure fluid generator 75 (FIG. 5) by way of the passageways 187 and 190.

In a similar manner, the inner surface 42 of the rearward flange 30 of the rearward end portion 35 of the workpiece 26 is engaged by outwardly-moving lower and upper rearward end hold-fast pins 206 and 208 (FIG. 3) reciprocably mounted in lower and upper bores 210 and 212 respectively and provided with inclined cam notches 214 and 216. These are engaged by the correspondingly-inclined cam ends 218 and 220 upon the inner ends of spring-pressed lower and upper plungers 222 and 224 respectively. These plungers are respectively provided with hydraulic clamping devices, generally designated 226 and 228, similar to the hydraulic pressure fluid supplied thereto from passageways 230 and 232 (FIGS. 1 and 4) hydraulically connected to the first hydraulic pressure fluid generator 75. Each of the clamping devices 200, 226, and 228 is provided with O-rings 234 (FIG. 1) for preventing leakage along their respective hold-fast pins 196, 198, 222, and 224.

In the operation of the invention, let it be assumed that the various parts of the fixture 10 are in the closed position of the latter and that it is desired to insert a workpiece 26 which it will be assumed for the moment to be absent from the fixture rather than present therein as shown in FIGS. 1 and 2. To open the fixture 10, the operator removes the locking shaft 112 by moving it out of its respective aligned coaxial bores 106, 108, and 110 (FIG. 4). He then swings the upper fixture block or cover 14 upward in a clockwise direction around the composite hinge shaft 70 (FIG. 2) until the lower and upper halves 18 and 20 of the cavity 22 are completely separated from one another and completely exposed. He then places the workpiece 26 in the lower cavity half 18 with its leading edge 44 of its airfoil portion 24 resting against the forward and rearward leading edge stops 116 which, it will be assumed, have been previously adjusted by the use of shim washers 126 of proper thickness to place the leading edge 44 of the airfoil portion 24 in the proper position in the cavity half 18 (FIG. 2). At the same time, the concave side 48 of the airfoil portion of the workpiece 26 is caused to rest upon the contoured tips of the two upwardly-inclined forward support pins 134 at its forward end and upon the single contoured tip rearward support pin 150 at its rearward end. The workpiece 26 is then pushed bodily forward until the inclined surface 40 of its forward flange 28 engages the contoured forward stop pin 132 (FIG. 1). The L-shaped leaf spring 114 now bears against the trailing edge 45 of the intermediate or airfoil portion 24 to maintain the entire workpiece 26 temporarily in its proper position.

The operator now closes the fixture 10 on the workpiece 26 by swinging the upper block or cover 14 counterclockwise around the composite hinge shaft 70 until its bore 110 in its boss 68 (FIG. 4) moves into alignment with the bores 106 and 108 in the bosses 64 and 66 of the lower block or base 12, whereupon he inserts the fixture locking shaft 112 in the now aligned bores 106, 110, and 108. Meanwhile, the lower and upper end hold-fast pins 196, 198, 206, and 208 have been spring-pressed into engagement with the forward and rearward flanges 28 and 30 of the workpiece 26.

The operator now rotates the screw piston 176 of the second hydraulic pressure fluid generator 175 clockwise by means of a hexagonal so-called Allen wrench in the socket 177, thereby applying pressure to the hydraulic fluid within the chamber 170 and passageway 168, thereby forcing the hydraulic clamping plungers 164 and 166 downward against the convex surface 46 of the airfoil portion 24 of the workpiece 26, clamping the latter firmly down upon the support pins 134 and 150. The operator now rotates the screw plunger 84 of the first hydraulic pressure fluid generator 75 in a clockwise direction by means of a hexagonal so-called Allen wrench in the socket 175, thereby applying pressure to the hydraulic fluid in its cylinder bore 90. This pressure fluid thus produced is conveyed through the passageways 187, 190, 192, 194, 230, and 232 to force inward their respective deformation-preventing pressure-equalizing plungers 186, 188, 196, 198, 206, and 208 against the opposite surfaces 46 and 48 of the airfoil portion 24 of the workpiece 26 and at the same time outward against the forward and rearward flanges 28 and 30 thereof. Because all of these plungers mentioned in the preceding sentence operate in response to pressure fluid received from the same hydraulic first-pressure fluid generator 75 within the composite hinge shaft 70, they will all press simultaneously on the top surface 46, bottom surface 48, and opposite end enlargements 33 and 35 of the workpiece 26, thereby preventing any appreciable distortion from occurring during subsequent machining. The operator now transfers the fixture 10, with its now-contained workpiece 26 thereby prevented from distortion, to the turret lathe or other suitable machine tool for machining of the forward and rearward end enlargements 33 and 35 respectively of the workpiece 26.

Figure 6:
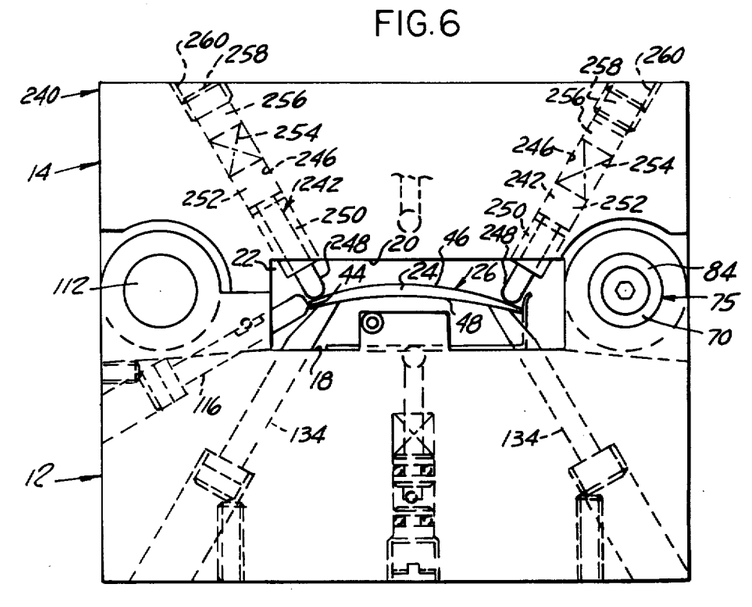
FIG. 6 is a front elevation of a second form of deformation-preventing workpiece-holding fixture employing spring-pressed workpiece clamping pins, the hydraulic pressure-equalizing plungers being omitted to simplify the drawing.
Figure 7:
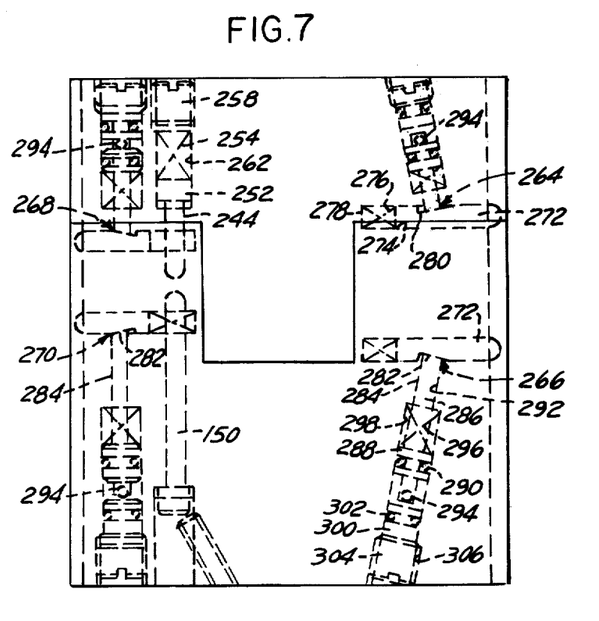
FIG. 7 is a left-hand side elevation of the fixture of FIG. 6, showing the spring-pressed horizontal end support plungers.

The second form of deformation-preventing pressure-equalizing fixture, generally designated 240, shown in FIGS. 6 and 7, with the pressure-equalizing hydraulic plungers 186 and 188 of FIGS. 1 and 2 omitted to simplify the showing, is of generally similar construction to the fixture 10 of FIGS. 1 to 4 inclusive, and similar parts are therefore designated with the same reference numerals. The lower half 12 of the fixture 240 thus has similar leading edge stops 116, two forward workpiece support pins 134, and a single rearward workpiece support pin 150 (FIG. 7). The fixture 240 differs from that of FIGS. 1 to 4 inclusive in that the workpiece 26 is held down against the support pins 134 and 150 by three spring-pressed clamping pins, namely two such downwardly and inwardly inclined forward nylon pins 242 (FIG. 6) are mounted in downwardly and inwardly-inclined bores 246 and have round-ended shanks 248 engagable with the upper surface 46 of the workpiece 26 while slidable in bearing bushings 250 mounted in bores 246. The heads 252 of the pins 242 are urged downward in the bores 246 by helical compression springs 254 pressing thereagainst and having spring abutment plugs 256 held in place by headless socketed so-called Allen screws 258 threaded into the threaded upper end portions 260 of the bores 246. The single vertical clamping pin 244 is slidably mounted in a single central vertical bore 262 (FIG. 7), but the construction is otherwise substantially the same except for the omission of the bearing bushing 250 and the spring abutment 256.

The four spring-pressed hydraulically-clamped horizontal end hold-fast pins (FIG. 7) are generally designated 264, 266, 268, and 270. The forward upper and lower such pins 264 and 266 engage the inner surface 40 of the forward end portion 28 of the workpiece 26 and are spring-urged forwardly, whereas the rearward upper and lower such pins 268 and 270 engage the inner surface 42 of the rearward end portion 30 of the workpiece 26 and are spring-urged rearwardly. Except for the fact that the forward workpiece end hold-fast pins 264 and 266 are hydraulically locked by slightly inclined transverse locking devices, and the rearward end hold-fast pins 268 and 270 are locked by vertical transverse locking devices, the construction of these four hold-fast pins 264, 266, 268, and 270 is otherwise the substantially the same, hence a single description with like reference numerals is believed to be sufficient.

The four end hold-fast pins 264, 266, 268, and 270 have round-ended contact pins 272 slidably mounted in horizontal bores 274 and urged outwardly thereof by helical compression springs 276 pressing against their inner ends and abutting the bottom wall 278 of their respective bores 274. Each of the contact pins 272 on one side is provided with an inclined flat locking notch portion 280 which is engaged by the correspondingly-inclined inner end 282 of the shank 284 of a spring-pressed locking plunger 286, the head 288 of which is annularly grooved to receive an O-ring 290 and is slidably mounted in a bore 292 communicating with a passageway 294 leading to the first hydraulic pressure fluid generator 75 (FIG. 5) as described in connection with FIGS. 1 to 4 inclusive. A compression coil spring 296 mounted in the counterbore 298 of the bore 292 urges the head 288 outward therein. The outer end of each counterbore 298 is provided with a plug 300 which is annularly grooved to receive an O-ring 302 and is held in place by a headless screw 304 threaded into the threaded outer end portions 306 of the counterbore 298.

The operation of the second form of deformation-preventing pressure-equalizing fixture 240 shown in FIGS. 6 and 7 is generally similar to that of the fixture 10 of FIGS. 1 to 5 inclusive, insofar as its lower half 12 is concerned and also as regards the pressure-equalizing hydraulic plungers 186 and 188 present in both the lower and upper halves 12 and 14 but omitted from FIGS. 6 and 7 to simplify the disclosure. As before, to insert a workpiece 26, the fixture-locking shaft 112 is removed and the upper fixture block or cover 14 is swung upward and to the right in a clockwise direction around the composite hinge shaft 70 to move the upper cavity half 20 away from the lower cavity half 18 so as to fully expose the complete cavity 22 for insertion of the workpiece 26. He then places the workpiece 26 in the lower cavity half 18 with the leading edge 44 of the airfoil portion 24 engaging the forward and rearward leading edge stops 116 and with its concave lower side 48 resting at its forward end upon the rounded carbide tips of the two upwardly inclined forward support pins 134 and at it rearward end upon the rounded carbide tip of the single rearward support pin 150. As before, the workpiece 26 is then pushed bodily forward until the inclined surface 40 of its forward flange 28 engages the carbide tip of the forward stop pin 132 (not shown in FIGS. 6 and 7 but shown in FIG. 1).

As before, with the fixture 10, the operator now closes the fixture 240 upon the workpiece 26 by swinging the upper block 14 counterclockwise downward around the composite hinge shaft 70 and inserts the fixture locking shaft 112 when the bores 106, 110, and 108 come into alignment (FIGS. 1 and 2). Meanwhile, the rounded tips of the inclined spring-pressed forward clamping pins 248 and of the single vertical rearward clamping pin 244 are brought into clamping engagement with the convex upper surface 46. These clamping pins 248 and 244 yield upward against their respective compression springs 254 and thus hold the airfoil portion 24 of the workpiece 26 firmly in position. At the same time (FIG. 7), the rounded ends of the forward upper and lower horizontal end hold-fast pins 264, 266, are spring-pressed into engagement with the inner surface 40 of the forward end enlargement 28 of the workpiece 26 and yield rearwardly, while at the same time, the rearward upper and lower horizontal end hold-fast pins 268 and 270 are spring-pressed into engagement with the inner surface 42 of the rearward end enlargement 30 of the workpiece 26 and yield forwardly.

The operator now rotates the screw plunger 84 of the first hydraulic pressure fluid generator 75 to generate hydraulic pressure fluid which forces inward the twelve pressure-equalizing plungers 186 and 188 (shown in FIGS. 1 to 4 but not shown in FIGS. 6 and 7) against the opposite surfaces 46 and 48 of the airfoil portion 24 of the workpiece 26 and also outward against the forward and rearward flanges 28 and 30 thereof. These twelve plungers press simultaneously on the top, bottom, and opposite end portions of the workpiece 26 and consequently prevent any harmful distortion thereof during subsequent machining. While this is occurring, hydraulic pressure fluid also travels through the passageway 294 to urge the four transverse locking plungers 286 of the four horizontal end hold-fast pins 264, 266, 268, and 270 (FIG. 7) against their locking portions or notches 280, thereby locking the horizontal end hold-fast pins 264, 266, 268, and 270 unyieldably in their attained positions. The operator now transfers the fixture 240 with its now contained workpiece 26 thereby prevented from distortion, to the selected machine tool for machining of the forward and rearward end enlargements 33 and 35 respectively of the workpiece 26.

Figure 8:
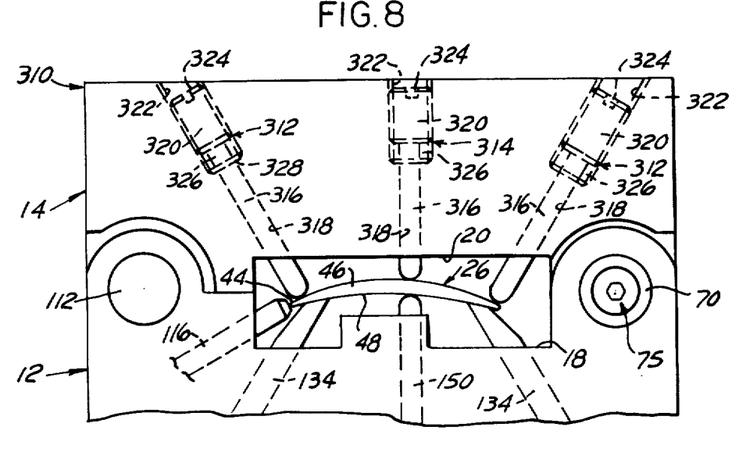
FIG. 8 is a fragmentary front elevation similar to FIG. 6, but showing screw-actuated workpiece clamping pins, with the hydraulic pressure-equalizing plungers also omitted to simplify the disclosure.

The third form of deformation-preventing pressure-utilizing fixture, generally designated 310 shown in FIG. 8, with the 12 pressure-equalizing hydraulic plungers 186 and 188 of FIGS. 1 and 2 and horizontal opposite end hold-fast pins 264, 266, 268, and 270 of FIGS. 6 and 7, also omitted to simplify the showing, is otherwise of generally similar construction to the fixture 10 of FIGS. 1 to 4 inclusive, and similar parts are therefore also designated with the same reference numerals. The fixture 310 differs from the first and second fixtures 10 and 240 by having three screw-actuated clamping pins, namely two downwardly and inwardly inclined forward clamping pins 312 and a single vertical rearward clamping pin 314, to hold the workpiece downward against the three support pins 134 and 150, namely the two downward and inwardly-inclined forward support pins 134 and the single vertical rearward support pin 150. Each of the pins 312 and 314 has a round-ended smooth shank 316 mounted in a smooth bore 318 and also has an enlarged externally-threaded head 320 rotatably mounted in a threaded counterbore 322. Each head 320 is provided with the usual hexagonal socket 324 for the insertion of a conventional so-called Allen wrench. The upper part of each smooth shank 316 at its junction with its head 320 passes through an annular adjustment cavity or clearance 326 which extends between the head 320 on its upper side and the annular shoulder 328 between the counterbore 322 and the bore 318 on its lower side.

The operation of the third form of fixture 310 shown in FIG. 8 is likewise generally similar to that of the fixture 10 of FIGS. 1 to 5 inclusive, insofar as its lower half 12 is concerned and also as regards the pressure-equalizing hydraulic plungers 186 and 188 and the horizontal end hold-fast pins 264, 266, 268, and 270 shown in FIGS. 6 and 7, present in both the lower and upper halves 12 and 14 but omitted from FIG. 8 to simplify the disclosure. As before, to insert a workpiece 26, the fixture-locking shaft 112 is removed and the upper fixture block or cover 14 is swung upward to the right in a clockwise direction around the composite hinge shaft 70 to move the upper cavity half 20 away from the lower cavity half 18 so as to fully expose the complete cavity 22 for insertion of the workpiece 26. The operator then places the workpiece 26 in the lower cavity half 18 with the leading edge 44 of the airfoil portion 24 engaging the forward and rearward leading edge stops and with its concave lower side 48 resting at its forward end upon the rounded tips of the two upwardly-inclined forward support pins 134 and at its rearward end upon the rounded tip of the single rearward support pin 150. As before, the workpiece 26 is then pushed bodily forward until the inclined rearward surface 40 of its forward flange 28 engages the carbide tip of the forward stop pin 132 (FIG. 1).

As before, the operator now closes the fixture 310 from the workpiece 26 by swinging the upper block 14 counterclockwise downward around the composite hinge shaft 70 and inserts the fixture locking shaft 112 when the bores 106, 110, and 108 come into alignment (FIGS. 1 and 2). He then rotates the screw-threaded heads 320 of the three clamping pins 312 and 314 clockwise in their threaded counterbores 322 until the rounded tips of the forward and rearward clamping pins 312 and 314 come into clamping engagement with the convex upper surface 46 of the workpiece 26. Meanwhile, the rounded ends of the spring-pressed upper and lower horizontal end hold-fast pins 264, 266, 268, and 270 (not shown in FIG. 8 but shown in FIGS. 6 and 7) are spring-pressed into engagement with the inner surfaces 40 and 42 of the forward and rearward end portions 28 and 30 of the workpiece 26 and yield inwardly.

The operator now rotates the screw plunger 84 of the first hydraulic pressure fluid generator 75 to generate hydraulic pressure fluid which forces inward the pressure equalizing plungers 186 and 188 (shown in FIGS. 1 and 4 but not shown in FIG. 8) against the opposite surfaces 46 and 48 of the airfoil portion 24 of the workpiece 26. These 12 hydraulic plungers press simultaneously with equalized pressures on the top and bottom of the thinner airfoil portion 24 of the workpiece 26 and consequently prevent any appreciable distortion thereof during subsequent machining. While this is occurring, hydraulic pressure fluid from the first hydraulic pressure fluid generator 75 passing through the passageways 294 also locks the four locking plungers 286 (FIG. 7) of the four horizontal end hold-fast pins 264, 266, 268, and 270 against their locking notches 280, thereby locking the horizontal end hold-fast pins 264, 266, 268, and 270 unyieldably in their attained positions. The operator now transfers the fixture 310 with its now contained workpiece 26, thereby prevented from distortion, to the selected machine tool for machining of the forward and rearward end portions 33 and 35 respectively of the workpiece 26.

Figure 9:
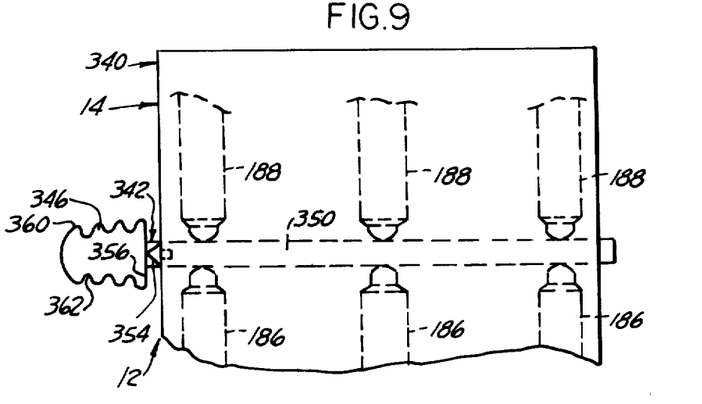
FIG. 9 is a fragmentary side elevation of a further fixture for a single-headed workpiece with an elongated thin portion extending entirely through the fixture where the enlargement is an annularly grooved tapered head.
Figure 10:
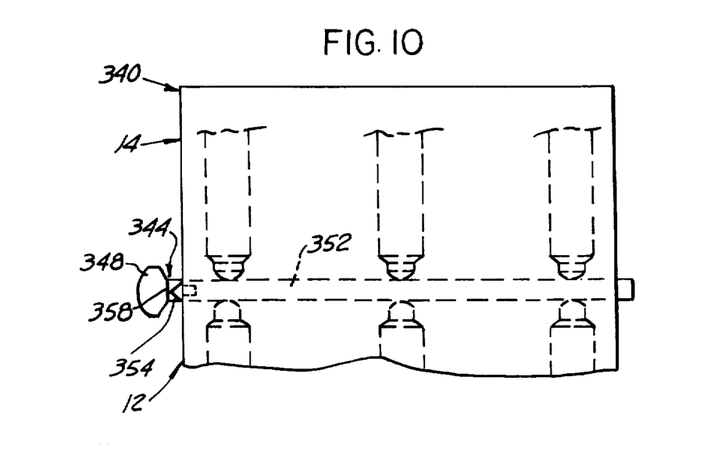
FIG. 10 is a fragmentary side elevation similar to FIG. 9, and for a similar single-headed workpiece wherein the head is of approximately lenticular cross-section.

The fixture 340 shown diagrammatically in FIGS. 9 and 10 is a fourth form of the invention modified to accommodate single-headed workpieces, generally designated 342 (FIG. 9) and 344 (FIG. 10). The fixtures 340 in both FIGS. 9 and 10 are identical in construction and differ only in the different shapes of end enlargements or heads 346 and 348 respectively of the workpieces 342 and 344. The elongated deformable thinner portions 350 and 352 pass entirely through the fixture 340, hence only a single forward stop 354 is required for each of the workpieces 342 and 344. The forward stop 354 engages the rearward or inner surfaces 356 and 358 respectively of the enlarged heads 346 and 348 of the workpieces 342 and 344. The enlarged head 346 of the workpiece 342 of FIG. 9 is of approximately pine cone shape with its tapered side surface 360 provided with annular grooves 362, whereas the enlarged head 348 of the workpiece 344 of FIG. 10 is of approximately hexagonal cross-section. It will be understood that the fixture 340 in FIGS. 9 and 10 is otherwise equipped with the workpiece supporting and clamping pins shown in the preceding figures of the drawing, and that the twelve hydraulic pressure equalizing plungers 186 and 188 (FIGS. 1 and 4) are present and are operated in the same manner as described above.

It will be evident from the foregoing description of the various forms of the invention that after the workpiece 26 has been machined in the selected machine tool, and the particular fixture has been removed from that machine tool, the operation of removing the workpiece 26 from the particular fixture 10, 240, 310 or 340 follows, in reverse order, the steps set forth above. It will also be evident that where the demand for quantity or importance of the workpiece 26 justifies the cost of a specially-constructed machine tool, the working parts, described above, of the fixtures 10, 240, 310, and 340 may be built into the machine tool itself rather than embodied in a separate and removable fixture, as described above, thereby still further speeding-up the operations described above and further reducing the cost of production of the workpieces 26.

I claim:

1. A deformation-preventing pressure-equalizing fixture for holding, in a machine tool during machining, a workpiece having a first end enlargement to be machined and having a thinner deformable portion adapted to be gripped by said fixture during such machining, said fixture comprising
   a block structure having a cavity therein adapted to receive the thinner deformable portion of said workpiece and having an end opening adapted to expose the end enlargement of the workpiece externally of said opening for machining,
   said block structure holding a base block and a cover block and a pivot element hingedly interconnecting said blocks and a locking device adapted to releasably lock said blocks together,
   a plurality of longitudinally-spaced edge stops and an end stop disposed in one of said blocks and projecting into said cavity and adapted to engage an edge and an end respectively of the thinner deformable portion of said workpiece,
   a plurality of workpiece support members disposed in spaced relationship to one another in said base block and projecting upward into said cavity and adapted to engage and support the bottom of the workpiece portion,
   a plurality of workpiece clamping members disposed in spaced relationship to one another in said cover block and projecting downward into said cavity with their lower ends disposed substantially in alignment with the upper ends of said support members and adapted to engage the top of the thinner deformable workpiece portion and hold the same down against said workpiece support members,
   means for urging said clamping members downward into such engagement with the thinner deformable workpiece portion,
   lower and upper sets of lower and upper pressure-equalizing hydraulic plungers of each set disposed in longitudinally-spaced and laterally-spaced relationship and with the upper hydraulic plungers aligned with corresponding lower hydraulic plungers and adapted to engage aligned locations on the top and bottom of the thinner deformable workpiece portion,
   and a first hydraulic pressure fluid generator hydraulically connected to said pressure-equalizing plungers.

2. A fixture, according to claim 1, wherein said means comprises hydraulic pressure-fluid-actuated devices operatively engaging said workpiece clamping members.

3. A fixture, according to claim 1, wherein said first hydraulic pressure fluid generator is disposed within said block structure.

4. A fixture, according to claim 1, wherein said first hydraulic pressure fluid generator is disposed within said pivot element.

5. A fixture, according to claim 1, wherein said workpiece clamping members include hydraulic actuators therefor, and wherein a second hydraulic pressure fluid generator is hydraulically connected to said actuators.

6. A fixture, according to claim 5, wherein said second hydraulic pressure fluid generator is disposed within one of said blocks.

7. A fixture, according to claim 1, wherein the workpiece has a second end enlargement disposed on the opposite end of the thinner deformable portion of the workpiece in spaced relationship to the first end enlargement, and wherein a plurality of horizontally-acting workpiece end hold-fast members are disposed adjacent the opposite ends of said cavity and are adapted to move substantially horizontally in opposite directions into pressure-applying engagement with the first and second end enlargements of the workpiece.

8. A fixture, according to claim 7, wherein said end hold-fast members are spring-pressed into workpiece engagement, and wherein hydraulic locking devices are disposed adjacent said end hold-fast members and hydraulically connected to one of said hydraulic pressure fluid generators and selectively movable hydraulically into and out of locking engagement with said end hold-fast members.

9. A fixture, according to claim 7, wherein said end hold-fast members are spring-pressed to move outwardly away from one another and are adapted to engage the inner sides of the workpiece end enlargements and to exert outwardly-directed pressure thereagainst.

10. A fixture, according to claim 1, wherein said first hydraulic pressure fluid generator includes a first threaded cylinder bore in said block structure and also includes a correspondingly-threaded first screw piston threadedly engaging said first cylinder bore.

11. A fixture, according to claim 1, wherein said second hydraulic pressure fluid generator includes a second threaded cylinder bore in said block structure and also includes a correspondingly-threaded second screw piston threadedly engaging said second cylinder bore.

12. A fixture, according to claim 1, wherein said pivot element has a recess therein, and wherein said first pressure fluid generator is disposed within said recess.

13. A fixture, according to claim 1, wherein said means comprises spring-actuated devices operatively engaging said workpiece clamping members.

14. A fixture, according to claim 1, wherein said means comprises screw-threaded actuating devices operatively connected to said workpiece clamping members.

15. A fixture, according to claim 8, wherein said end hold-fast members have locking portions thereon, and wherein said locking devices include transversely-disposed locking plungers hydraulically movable selectively into and out of locking engagement with said locking portions.

* * * * *